United States Patent
Washio et al.

[15] 3,658,563
[45] Apr. 25, 1972

[54] PRODUCTION OF REFRACTORY BODY

[72] Inventors: Shigeaki Washio, Kakogawa; Masaharu Inoue, Takamachi, both of Japan

[73] Assignee: Taki Fertilizer Manufacturing Co., Ltd., Befucho, Kakogawa, Japan

[22] Filed: July 24, 1970

[21] Appl. No.: 58,206

[30] Foreign Application Priority Data

July 26, 1969  Japan.....................................44/59166

[52] U.S. Cl.....................................106/55, 106/57, 106/58, 106/65, 106/85
[51] Int. Cl. .......................................C04b 35/04
[58] Field of Search......................106/55, 57, 58, 63, 65, 67, 106/85

[56] References Cited

UNITED STATES PATENTS

| | | | |
|---|---|---|---|
| 2,072,212 | 3/1937 | Moosdorf et al. | 106/68 |
| 3,316,110 | 4/1967 | Herbst et al. | 106/65 |

*Primary Examiner*—James E. Poer
*Attorney*—Wenderoth, Lind & Ponack

[57] ABSTRACT

The present invention relates to a method for providing a refractory body characterized by the use as a binder or aggregate therefor, of an aqueous solution of phosphoric acid and/or acid phosphate and an alkanolamine. This composition containing the aforementioned binder is stable for a long period of time, has excellent adhesion at normal temperature and exhibits an excellent bonding effect and strength at high temperatures.

11 Claims, No Drawings

PRODUCTION OF REFRACTORY BODY

This invention relates to a method for producing a refractory body and more particularly to an improvement in a method for producing a refractory body by the use of phosphoric acid and/or acid phosphate as a binder for aggregate.

It is known to use various binders for aggregate to make refractory or article. Typical examples of such binders are clay, alumina cement, sodium silicate, phosphoric acid and acid aluminum phosphate.

When clay is used, the strength of the refractory body increases with the rise of the firing temperature, and the normal temperature strength after the heating quickly increases due to sintering from about 1,000° C. but the hot strength becomes a maximum at about 500° to 1,000° C. but reduces with the further rise of the temperature and becomes very low around 1,400° C.

When alumina cement is used, the strength gradually reduces due to the dehydration. The normal temperature strength after the heating becomes minimum around 900° to 1,000° C. On the other hand, with the rise of the temperature, the hot strength also reduces gradually and becomes remarkably low above about 1,000° C. Therefore, its uses are generally limited to be for medium and low temperatures.

Sodium silicate has a proper adhesion at the normal temperature, but has a defect that the hot strength extremely reduces at temperatures above 800° C.

Generally the properties strongly desired for a binder for making a refractory body are that, in case it is mixed and kneaded with an aggregate, it remains plastic and stable for a long period of time, has a proper adhesion at the normal temperature, hardens with the rise of the temperature and strongly bonds with the aggregate at a high temperature so as to be refractory and heat-resistant.

In this respect, phosphoric acid, or acid phosphate such as acid aluminum phosphate or acid chromium phosphate is high in the resistance to fire and heat and remains strongly bonded with the aggregate even during or after it is exposed to heat. Therefore, such phosphoric acid or phosphate is expected to be an excellent binder for refractory material. However, such phosphoric acid or acid phosphate is high in the acidity so that when it is mixed with aggregate the mixture will gradually cause reaction and hardened while it is stored, and often becomes unworkable. This tendency is remarkable particularly when clay or magnesia clinker high in the chemical reactivity is used as an aggregate or is used together with another aggregate.

In order to overcome this drawback it has been proposed to use an organic acid such as oxalic acid, acetic acid or citric acid together with phosphoric acid or acid phosphate binder. However, this measure has been not successful because only a slight delay in the reaction is possible thereby and the problem is not basically solved yet.

Therefore, it is an object of this invention to overcome the above mentioned drawbacks encountered when phosphoric acid or acid phosphate is used as a binder for making a refractory body.

It is another object of this invention to provide a very effective reaction inhibitor for a material comprising phosphoric acid or acid phosphate and aggregate for making a refractory body.

According to this invention, there is provided a method for producing a refractory body characterized by the use, as a binder for aggregate, of an aqueous solution of phosphoric acid and/or acid phosphate and an alkanolamine.

The composition comprising an aggregate and an aqueous solution of phosphoric acid and/or acid phosphate and an alkanol amine is stable for a very long period of time and which has a proper adhesion and is favorable in the workability at the normal temperature and has a strong bond and strength at a high temperature.

Thus, for example, when 500 c.c. of an aqueous acid aluminum phosphate solution ($P_2O_5$ concentration 35.4 percent, $Al_2O_3$ concentration 8.1 percent, pH 1.8 at 25° C.) where taken into a beaker of a capacity of 1 liter and water was gradually added thereto with stirring, precipitation of basic aluminum phosphate was observed. This phenomenon was due to the variation in the pH of the aluminum phosphate solution, that is, the variation in the dissociation degree of $H_2PO_4^-$ in said solution.

Therefore, when such solution is mixed with an aggregate and stored, not only the mixture causes reaction to harden within a short period of time but also the viscosity which is a characteristic of acid aluminum phosphate vanishes and the mixture becomes not proper as a refractory or particularly as a plastic refractory material. In fact, when a mixture prepared by mixing 12 parts of the above acid aluminum phosphate solution (with 100 parts of a chamotte (64.8 percent $SiO_2$, 33.4 percent $Al_2O_3$, particle size 8 percent + 48 meshes, 25 percent − 48 to + 100 meshes, 15 percent − 100 to + 200 meshes and 52 percent − 200 meshes) as a typical aggregate was left to stand at normal temperature, it was solidified within about 40 hours and its plasticity disappeared. Similarly, when 10 parts of the above acid aluminum phosphate solution were mixed with 100 parts of magnesia clinker (particle size −40 to 100 meshes) the reaction proceeded so quickly that said system hardened after about several minutes and its plasticity was lost perfectly.

As still another example, when an ammonia solution ($NH_3$ concentration 28 percent) was added with stirring into the above mentioned acid aluminum phosphate solution, a milk-white gel was produced from a pH of about 2.3 and became useless as a binder. The same phenomenon was observed when diethylamine was added instead of ammonia.

On the other hand, when monoethanolamine to be used in the process of the present invention was added with stirring into the same acid aluminum phosphate solution, a semitransparent gel was once formed at a pH of 2.0 to 2.5. However, when the monoethanol amine was further added, the gel was dissolved and the whole became a transparent uniform viscous solution and remained in such state for a long period of time even at a pH above 7. A similar phenomenon was observed when phosphoric acid solution was used instead of the acid aluminum phosphate.

Thus, when an alkanolamine is added to phosphoric acid and/or acid phosphate according to the present invention, the reactivity of the binder with the aggregate can be inhibited for a long time without impairing the desirable adhesion and plasticity at the normal temperature.

It appears to be due to the formation of a chelate between phosphoric acid or acid phosphate and alkanolamine that the phosphoric acid or acid phosphate remains stable in the presence of the alkanolamine in spite of the increase in pH.

As phosphoric acids and/or acid phosphates to be used in the present invention, there are exemplified orthophosphoric acid, phosphorous acid and polyphosphoric acids and salts thereof with metals which are thermally stable and heat-resistant in the presence of phosphoric acid ions, such as acid aluminum phosphate, acid chromium phosphate, acid aluminum-chromium phosphate, acid zirconium phosphate, acid nickel phosphate, acid molybdenum phosphate and acid aluminum-nickel phosphate. It is also possible to use a mixture of two or more of them.

As preferable alkanolamines to be used in the present invention, there may be enumerated alkanolamines in which the number of carbon atoms in the alkanolmoiety is not more than 5, for example, monoethanolamine, diethanolamine, triethanolamine, propanolamine, butanolamine, dibutylaminoethoxyethanol, dimethylamino-2-propanol, diisopropylamino-2-propanol, dibutylaminoethanol and isobutylamino-2-propanol.

The amount of such alkanolamine to be added may vary depending on the particular kind of the alkanolamine, acid phosphate and aggregate, the desired use of the resulting refractory body and also on the preserving period of the mixture with the aggregate. However, generally, about 1 to 500 parts per 100 parts of $P_2O_5$ may be used. Below the above mentioned range, the effect of the alkanolamine is not remarkable. On the other hand, even if more than 500 parts are added, no effect by the increase of the amount of addition can be expected.

In any case, it is preferable that the amount of addition of such alkanolamine is such that the pH of the resulting solution of the phosphoric acid and/or acid phosphate with the alkanolamine or with a carboxylic acid, if used, is 2.5 to 10. Particularly, in case it is necessary to store or preserve the mixture for a long period of time before use, a range of pH of 4 to 9 is preferable.

In additing the binder to the aggregate, it is preferable to first mix phosphoric acid and/or acid phosphate and the alkanolamine and then mix the resulting mixed solution with the aggregate. However, in some cases, it is possible to add either one with the aggregate and then immediately add the other.

A kneaded mixture of an aggregate, phosphoric acid and/or acid phosphate and alkanolamine prepared by such method is formed into a desired shape and is then heated. With the rise of the temperature, nitrogen compound volatilizes and the phosphoric acid reacts with the aggregate to produce a shaped refractory body of a high strength.

As already mentioned, when an alkanolamine is added to a phosphoric acid and/or acid phosphate solution, the mixture may once form gel in a zone of a high acidity. In such case, if a small amount of a carboxylic acid, particularly oxycarboxylic acid having a chelatability, such as acetic acid, oxalic acid, tartaric acid, citric acid or glycolic acid is added to the mixture, such problem is easily solved and a very stable solution is obtained.

Such carboxylic acid may be added to a solution of the phosphoric acid and/or acid phosphate or to a mixed solution with the alkanolamine. The amount of the acid may be such as to prevent the gel formation and may generally be about 0.1 to 50 parts per 100 parts of $P_2O_5$.

The phosphoric acid or acid phosphate may be used in the form of a solution in a concentration up to 65 percent by weight (as $P_2O_5$). As mentioned before, alkanolamine, and in some cases a carboxylic acid, is added thereto so that the pH of the resulting solution will be 2.5 to 10. The mixture (binder) is mixed with an aggregate in an amount of 0.3 - 100 parts by weight (as $P_2O_5$) per 100 parts of the aggregate.

The important novel feature of this invention is in the addition of an alkanolamine to the phosphoric acid or acid phosphate binder for an aggregate for making a refractory body, and except this novel feature, the operation for producing refractory body may be conducted in a manner well known in the art.

The invention will be explained in more detail by referring to the following Examples wherein all parts are by weight.

EXAMPLE 1

One hundred parts of a chamotte (38.8 percent $SiO_2$, 56.5 percent $Al_2O_3$, particle size 0.7 percent of +48 meshes, 11.8 percent −48 to +100 mehses, 15.8 percent −100 to +200 and 71.7 percent −200 meshes) as an aggregate with the addition of respectively (A) 17 parts of a phosphoric acid solution of a $P_2O_5$ concentration of 13.0 percent as mixed and kneaded, (B) 17 parts of an acid aluminum phosphate solution (12.9 percent $P_2O_5$ and 2.9 percent $Al_2O_3$) of an $P_2O_5$ concentration close to that of the above mentioned phosphoric acid solution, (C) 17 parts of a mixed solution (13.1 percent $P_2O_5$ and a pH of 8.5 at 25° C.) of phosphoric acid and triethanol amine and of a $P_2H_5$ concentration close to that of the phosphoric acid solution of the above mentioned (A) as mixed and kneaded, and (D) 17 parts of a mixed solution (12.9 percent $P_2O_5$, 2.7 percent $Al_2O_3$ and 2.4 percent tartaric acid and a pH of 8.3 at 25° C.) of acid aluminum phosphate solution and triethanol amine and of a $P_2O_5$ concentration close to that of the phosphoric acid solution of the above mentioned (A) as mixed and kneaded were poured into respective wood frames of 10 × 10 × 10 cm. and the filled frames were put into a constant tempreture and humidity bath of a temperature of 25° C. and a humidity of 65 percent and the hardness of the mass in the frame with the lapse of time was measured. The results are shown in Table 1 wherein the hardness was determined by naturally dropping an iron bar of a diameter of 2 cm. and a weight of 500 g. from a height of 30 cm. and measuring the depth penetrated from the surface.

TABLE 1

| Time (days) | Controls | | Examples of the invention | |
|---|---|---|---|---|
| | (A) | (B) | (C) | (D) |
| 1 | 3.5 cm. | 4.5 cm. | 4.5 cm. | 5.5 cm. |
| 3 | 1.0 | 2.0 | 4.5 | 5.0 |
| 10 | 0.0 | 0.0 | 4.5 | 5.0 |
| 30 | - | - | 4.5 | 5.0 |
| 60 | - | - | 4.0 | 5.0 |
| 150 | - | - | 4.0 | 4.5 |
| 180 | - | - | 4.0 | 4.5 |

As shown in Table 1, the composition prepared by the present is substantially constant in the hardness and therefore can be stored for a long time.

EXAMPLE 2

17 parts of a mixed aqueous solution (23.8 percent $P_2O_5$, 5.5 percent $Al_2O_3$, pH 7.2 at 25° C.) of acid aluminum phosphate and monoethanolamine were added to 100 parts of a chamotte (65.2 percent $SiO_2$ and 26.0 percent $Al_2O_3$, particle size 13 percent +48 meshes, 19.0 percent −48 to +100 meshes, 11.3 percent −1-- to +20 meshes and 56.7 percent −200 meshes). The mixture was kneaded and was stored as sealed for about 150 days, but it remained plastic without solidifying.

On the other hand, when, as a control, an acid aluminum phosphate solution (23.0 percent $P_2O_5$, 5.7 percent $Al_2O_3$, pH 1.8 at 25° C.) was mixed and kneaded with the above mentioned aggregate at the same mixing ratio and the mixture was sealed and stored for about 5 days, it solidified and could not be used for shaping into a refractory article.

The hot compressive strength of the kneaded mixture prepared by using the above mentioned mixed aqueous solution of the acid aluminum phosphate and monoethanolamine was 175 kg./cm.$^2$ at 1,000° C. while the hot compressive strength when sodium silicate (20.0 percent $SiO_2$, 10.5 percent $Na_2O$) was used as a binder was 30 kg./cm.$^2$ at 1,000° C. Thus a great difference was recognized between them.

EXAMPLE 3

A solution prepared by adding 0.3 part of tartaric acid to 15 parts of a mixed aqueous solution (13.8 percent $P_2O_5$, 3.4 percent $Al_2O_3$, 1.2 percent $Cr_2O_3$, pH 7.5 at 25° C.) of acid aluminum-chromium phosphate and monoisopropanolamine was added to and mixed and kneaded with 100 parts of a high alumina chamotte (30.8 percent $SiO_2$, 64.0 percent $Al_2O_3$, particle size 0.8 percent of +48 meshes, 11.9 percent −48 to +100 meshes, 15.8 percent −100 to +200 meshes and 71.5 percent −200 meshes) as an aggregate and the mixture was stored as sealed for 180 days. The mixture remained plastic without solidifying.

On the other hand, in case an acid aluminum phosphate solution (13.5 percent $P_2O_5$, 3.4 percent $Al_2O_3$, 1.1 percent $Cr_2O_3$, 1.5 percent tartaric acid, pH 1.5 at 25° C.) was mixed and kneaded at the same mixing ratio and the mixture was stored for about 3 days, it was solidified or hardened.

The hot compressive strength of the above mentioned kneaded mixture of the mixed solution of acid aluminum-chromium phosphate and monoisopropanolamine was 197 kg./cm.$^2$ at 1,000° C., while the hot compressive strength in case, as a control, equalamounts of sodium silicate and plastic clay were used as a binder was 52 kg./cm.² and it was recognized that there was a great difference from the example of the present invention.

EXAMPLE 4

One hundred parts of a high purity alumina (98.9 percent $Al_2O_3$, 0.2 percent $SiO_2$, particle size 20 percent +48 meshes, 15 percent −48 to +110 meshes, 30 percent −100 to +200 meshes and 35 percent −200 meshes) and 3 parts of a solution prepared by adding citric acid (0.2 percent based on $P_2O_5$) to the mixed aqueous solution of acid aluminum phosphate and monoethanolamine of the same composition as in Example 2 were mixed together. The mixture was then left standing for a predetermined time and was compressed under 500 kg./cm.² to make test pieces of 2.5 × 2.5 × 6 cm. Each test piece was fired at 1,200° C. for 2 hours. The physical properties are as shown in the following Table. On the other hand, as a control, 3 parts of an acid aluminum phosphate solution of the same composition as in Example 2 were added to and mixed with the above mentioned aggregate. The mixture was treated in the same manner and the physical properties were also measured.

| | Compressive strength (kg./cm.²) | Porosity (%) |
|---|---|---|
| 1. Just after mixing: | | |
| The present invention | 412 | 2.54 |
| Control | 400 | 13.44 |
| 2. 3 hours after mixing: | | |
| The present invention | 405 | 7.00 |
| Control | 318 | 17.81 |
| 3. 24 hours after mixing: | | |
| The present invention | 407 | 9.15 |
| Control | 305 | 21.10 |

Thus when a binder of the present invention is used, the chemical reactions at the time of mixing it with the aggregate and with the lapse of time after mixing it until pressure-molding are inhibited and therefore an excellent refractory body having a high strength and low porosity is obtained. On the other hand, with a conventional acid phosphate, as apparent from the above indicated results, due to the chemical reactions which occur with the lapse of time, the performances as a binder are lost and no refractory body having desirable physical properties is obtained.

EXAMPLE 5

Five parts of a mixed aqueous solution (21.3 percent $P_2O_5$, 6.8 percent $Cr_2O_3$, 2.0 percent citric acid, pH 7.8 at 25° C.) of acid chromium phosphate, monoethanolamine and citric acid were added to and mixed with 100 parts of a magnesia clinker (97.9 percent MgO, 0.8 percent CaO, 0.4 percent $SiO_2$, particle size 15 percent +48 meshes, 35 percent −48 to +100 meshes, 30 percent −100 to +200 meshes and 20 percent −200 meshes) as an aggregate. The mixture was compressed under 600 kg./cm.² to make test pieces of 7 × 12 × 23 cm. The physical properties of the refractory bodies resulting from firing by varying the firing temperature were measured. The results are shown in the following Table. In case, as a control, an aqueous solution of chromium phosphate (21.7 percent $P_2O_5$, 6.9 % $Cr_2O_3$, pH 1.4 at 25° C.) was used in the same manner as mentioned above, a quick chemical reaction occurred already at the time of mixing with the aggregate and no refractory body could be molded.

| | Compressive strength (kg./cm.²) | Porosity (%) |
|---|---|---|
| 1. Fired at 600° C. | 380 | 21 |
| 2. Fired at 800° C. | 405 | 18 |
| 3. Fired at 1,000° C. | 375 | 19 |
| 4. Fired at 1,400° C. | 490 | 18 |

EXAMPLE 6

The hardness after 10 days of a mixture (A) prepared by mixing 100 parts of a fired bauxite (81.5 percent $Al_2O_3$, 11.9 percent $SiO_2$, 4.0 $TiO_2$, 3.8 percent $Fe_2O_3$, particle size 17 percent −48 to +100 meshes, 36 percent −100 to +200 meshes and 47 percent −200 meshes) as an aggregate with 9 parts of a solution prepared by mixing together in advance 10 parts of an aqueous solution of acid aluminum-nickel phosphate (22.3 percent $P_2O_5$, 7.5 percent $Al_2O_3$, 2.2 percent NiO) and 6 parts of dibutylaminoethoxyethanol, a mixture (B) prepared by mixing dibutylaminoethoxyethanol (at the same rate as in (A)) and then acid aluminum-nickel phosphate (at the same rate as in (A)) with the above mentioned aggregate; and a mixture (C) prepared by mixing only acid aluminum-nickel phosphate (at the same rate as in (A)) with the above mentioned aggregate were measured by the same testing method as in Example 1. The results were 4.8 cm. in (A), 4.5 cm. in (B) and 0 cm. in (C).

From the above results, it will be understood that, when the alkanolamine is first mixed with the acid phosphate and is then used, better results are brought about.

EXAMPLE 7

One hundred parts of a fired bauxite of the same composition as in Example 6 as an aggregate were added to and mixed with a mixed aqueous solution (A) of an aqueous solution (23.4 percent $P_2O_5$ and 2.8 percent $MoO_3$) of an acid molybdenum phosphate and butanolamine (8 % based on $P_2O_5$), and with a solution (B) prepared by adding glycolic acid (3 percent based on $P_2O_5$) to said solution (A). The hardnesses after 60 days of both mixtures were measured by the same testing method as in Example 1. The results are 5.1 cm. in (A) and 5.3 cm. in (B).

What is claimed is:

1. In a process for producing a refractory body which comprises mixing an aggregate and a binder and curing the mixture to form the refractory body, the improvement wherein the binder is selected from the group consisting of phosphoric acid, acid phosphates and mixtures thereof and an alkanolamine, wherein the alkanolamine is present in amounts of 1 – 500 parts per part of $P_2O_5$.

2. A process as claimed in claim 1 wherein the aqueous solution further contains a carboxylic acid.

3. A process as claimed in claim 1 wherein an aqueous solution of the phosphoric acid and acid phosphate or mixtures thereof is first mixed with an alkanolamine, and then the mixture is mixed with the aggregate.

4. A process as claimed in claim 2 wherein an aqueous solution of the phosphoric acid and acid phosphate and mixtures thereof, an alkanolamine and a carboxylic acid are mixed together, and then the mixture is mixed with the aggregate.

5. A process according to claim 1 wherein the number of carbon atoms in the alkanol moiety of said alkanolamine is not more than 5.

6. A process as claimed in claim 1 wherein said acid phosphate is a metal acid phosphate wherein the metal is at least one selected from Al, Mo, Ni and Zr.

7. A process as claimed in claim 2 wherein said carboxylic acid is an oxycarboxylic acid.

8. A process according to claim 2 wherein the amount of said carboxylic acid is 0.1 to 50 parts per 100 parts of $P_2O_5$.

9. A process according to claim 8 wherein the amount of the alkanolamine and the amount of the carboxylic acid are such that the resulting solution has a pH from 2.5 to 10.

10. A composition for producing a refractory body which consists essentially of an aggregate and a binder, said binder consisting essentially of an aqueous solution of a member consisting of phosphoric acid, acid phosphate or mixtures thereof, and an alkanolamine with not more than five carbon atoms in the alkanol moiety and having a pH from 2.5 to 10, wherein the amount of alkanolamine is 1 to 500 parts per 100 parts of $P_2O_5$, the amount of binder being 0.3 – 100 parts by weight as $P_2O_5$ per 100 parts of the aggregate.

11. A composition as claimed in claim 10 wherein the binder further comprises an oxy-carboxylic acid.

* * * * *